Jan. 10, 1950 L. H. BAGHUIS 2,494,081
VEHICLE FOR PASSENGER TRANSPORT
Filed April 29, 1947 2 Sheets—Sheet 1

INVENTOR
Ludovicus Hendrikus Baghuis
By Robert E. Burns
ATTORNEY

Patented Jan. 10, 1950

2,494,081

UNITED STATES PATENT OFFICE 2,494,081

VEHICLE FOR PASSENGER TRANSPORT

Ludovicus Hendrikus Baghuis, Best, Netherlands

Application April 29, 1947, Serial No. 744,674
In the Netherlands May 17, 1946

7 Claims. (Cl. 296—28)

The invention relates to a vehicle for passenger transport, for instance a motor-bus, the body of which is provided with a bottom which is substantially supported by a central main beam and transverse trusses.

Up till the present in such vehicles as few as possible relatively heavily constructed cross-beams were used. The latter were constructed as a box or a tube or were made of profile bars. Supported by these cross-beams was the car-bottom which in its turn served as a support to the interior parts of the vehicle, e. g. the benches.

The invention has for its object to provide a vehicle of which the bottom and the parts supporting the same are of an extraordinary light construction and are better accommodated to the inner arrangement of the vehicle. It consists in this, that the trusses mounted on the main beam are constructed in the form of a web structure and that the posts thereof extend through the plane of the bottom and constitute legs of benches or posts of partitions. This construction permits the trusses being made of relatively thin bars and the bottom, which hardly requires any longitudinal bracing, to be constructed very lightly. In spite of the fact that often two trusses per bench are required the bottom construction with appurtenances appears to be considerably lighter than that of the known vehicles. The trusses may for instance be constructed of thin-walled tubes, such as is used in bicycle-frames. It appears to be advantageous to attach the trusses, in contrast with the known constructions, in a detachable manner to the main beam. The trusses according to the present invention are adapted to be manufactured separately by mass-production and to be mounted on the main beam in accordance with the arrangement of the interior of the vehicle.

It may be stated, that the invention may be applied both to vehicles, the chassis of which substantially consists of a central girder, and to vehicles having a box-like self-supporting body, the bottom of which is reinforced by a central main beam.

Figure 1:
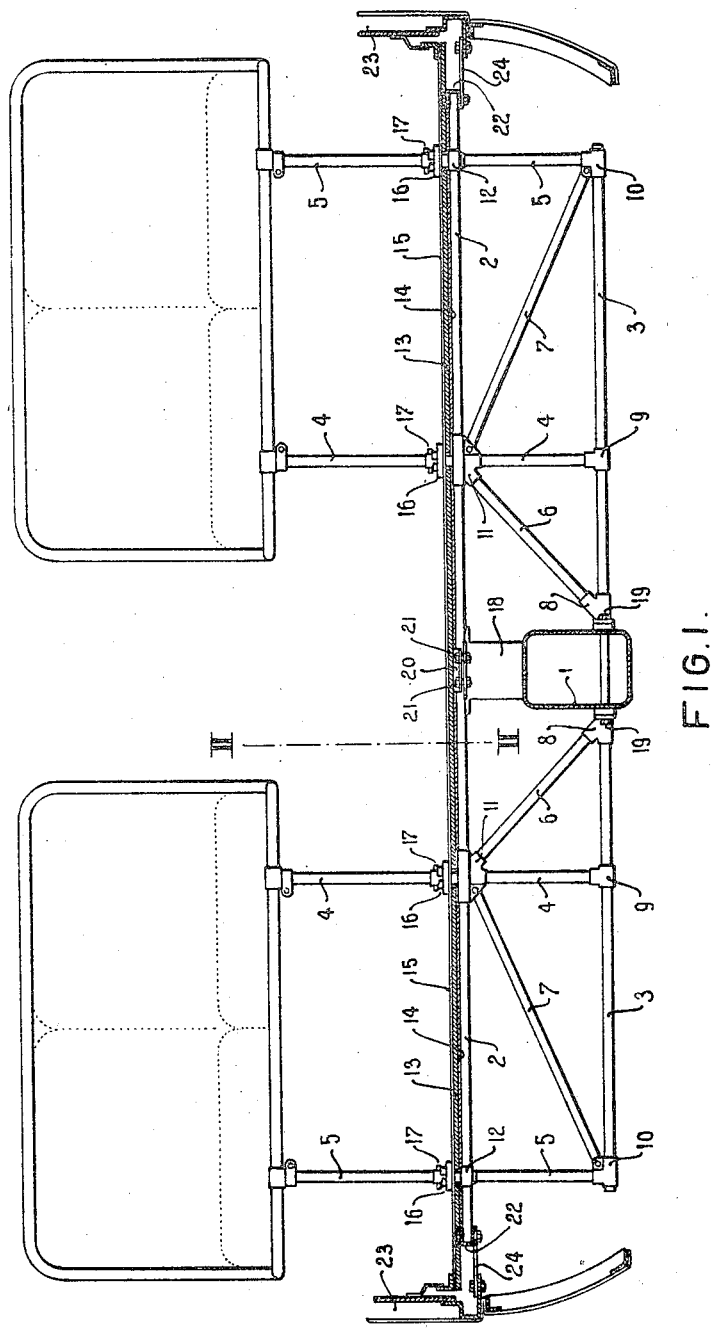
Figure 2:
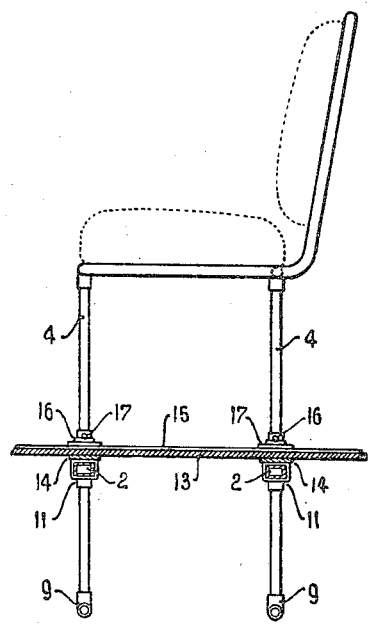
Figure 3:
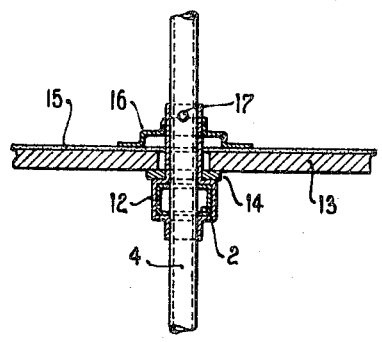

These and other features of the invention will be elucidated with the aid of the accompanying drawing, in which:

Fig. 1 is a cross-sectional view of the bottom construction of a vehicle according to the invention, Fig. 2 is a sectional view on line II—II in Fig. 1, and Fig. 3 is a sectional view of a detail on a larger scale.

In the drawing 1 is a central longitudinal beam which supports the bottom of the body of a motor-car. This longitudinal beam is suspended from the side-walls of the self-supporting car-body by cross-beams (not shown) only in or near the places wherein the wheels, or the sets of wheels, are attached to said walls. In order to support the bottom, transverse trusses in the form of a web structure are mounted on the main beam. Each of these trusses consists of a horizontal tubular girder 2 having a rectangular cross-section, a horizontal tube 3, two tubular posts 4 and 5, a tubular diagonal 6 and a solid diagonal 7. In the points of junction of the frame-work fitting tubular joints 8, 9, 10, 11, 12 are provided, in which the tubes are fixed by copper solder or an alloy thereof such as is known for bicycle frames. The diagonal 7 is riveted or more or less pivotally secured in another way to said tubular joints 10, 11, so that the chance of rupture owing to fatigue is restricted as much as possible. The posts 4 and 5 are lengthened at their upper ends, pass through holes in the horizontal tube 2 and the bottom and serve as legs of the benches of the vehicle.

The bottom consists of a wooden layer of for instance a laminated type of board, which is supported by the tubes 2 of the consoles through strips of felt 14. Lying on the wood is a layer of linoleum or rubber 15. The bottom plates are held to the trusses by means of holding members which engage the upwardly projecting portions of the tubular joints 11 and 12, said holding members having sleeve portions for holding the posts 4 and 5, and which cooperate with fixed studs 17 with their inclining upper surfaces.

The upper horizontal rods 2 of two trusses mounted symmetrically with respect to the main beam 1 form one rod or tube which crosses said main beam and is supported by a stool 18 welded to the main beam 1. The trusses are detachably secured to the main beam by means of bolts 19, a brace 20 and bolts 21.

The trusses are interconnected at their free ends by longitudinal channel beams 22. At the location of each of the described transverse trusses the connection between the bottom construction and the side-walls 23 consists only of leaf-springs 24 permitting all movements of the car-bottom with respect to the side-walls of the car-body owing to the load, but preventing said side-walls from being bent inwards or outwards, In the illustrated embodiment two trusses are placed under each bench 25. It is also possible to provide two trusses under each set of back to back placed benches, so that under each bench only one truss is provided.

What I claim is:

1. A vehicle for passenger transport of the type described, comprising a car body, a bottom forming part of said body, a central main beam, a series of spaced open work transverse trusses, attached to said main beam, said beam and said trusses forming part of said body and supporting the bottom thereof, and said open work transverse trusses having vertical members extending through the plane of said bottom and constituting legs of benches and posts of partitions.

2. A vehicle for passenger transport of the type described, comprising a car body, a bottom forming part of said body, a central main beam, a series of spaced open work transverse trusses attached to said main beam, said beam and said trusses forming part of said body and supporting the bottom thereof, said open work transverse trusses each consisting at least of two horizontal members one above the other, two vertical members and two diagonal members, one of which is provided between said main beam and the innermost vertical member and the other between the two vertical members, said latter diagonal member being linked to the respective points of junction of the open work truss, and said vertical members extending through the plane of said bottom and constituting legs of benches and posts of partitions in the car body.

3. A vehicle as set forth in claim 2 wherein the upper horizontal members of two transverse trusses mounted symmetrically with respect to the main beam form a unitary member crossing said beam.

4. A vehicle as set forth in claim 2 wherein the open work transverse trusses substantially consist of thin-walled tubes.

5. A vehicle as set forth in claim 2 wherein the upper horizontal member of a transverse truss consists of a tube of rectangular cross-section and the vertical members are passed through said tube.

6. A vehicle as set forth in claim 2 wherein the transverse trusses are detachably connected to the main beam.

7. A vehicle as set forth in claim 2 wherein the floor of the car body rests on the upper horizontal members of the transverse trusses and annular members for keeping said floor in place are mounted on the vertical members of the trusses, said annular members having cam-shaped upper surfaces which engage stop members on said vertical members.

LUDOVICUS HENDRIKUS BAGHUIS.

REFERENCES CITED

The following references are of record in the file of this patent:

UNITED STATES PATENTS

| Number | Name | Date |
|---|---|---|
| 401,529 | Zurcher | Apr. 16, 1889 |
| 699,340 | McLoughlin | May 2, 1902 |
| 2,119,655 | Stout | June 7, 1938 |
| 2,426,582 | Austin | Sept. 2, 1947 |